United States Patent Office 3,591,537
Patented July 6, 1971

3,591,537
PRODUCTION OF POLYVINYL AROMATIC COMPOSITIONS
John Mansel Squire, Thorpe, and Michael John Symes, Sutton, England, assignors to The British Petroleum Company Limited, London, England
No Drawing. Filed June 5, 1968, Ser. No. 735,958
Claims priority, application Great Britain, June 22, 1967, 28,800/67
Int. Cl. C08f *19/04, 19/08, 33/02*
U.S. Cl. 260—17                               13 Claims

ABSTRACT OF THE DISCLOSURE

Preformed vinyl aromatic polymer and rubber are dissolved in vinyl aromatic monomer. The resulting blend is suspended in water and polymerised to give a toughened polyvinyl aromatic compound such as toughened polystyrene.

---

This invention relates to a process for the production of toughened polymers of vinyl aromatic compounds, i.e., polymeric compositions containing rubber whose impact strengths are increased because of the presence of the rubber.

A previous process for the production of such material comprises two stages—a so-called prepolymerisation stage and a suspension stage.

In the prepolymerisation stage, a solution of a rubber in a vinyl aromatic compound, usually styrene, is bulk polymerised in the presence of a free radical catalyst until approximately 25% conversion of monomer to polymer is achieved. The resulting intermediate product is a solution of polystyrene in styrene containing droplets of a solution of rubber in styrene, the solutions being immiscible. Some styrene/rubber graft copolymer is also formed which acts as an emulsifier and stabiliser for the system since the styrene portion of the copolymer is soluble in the polystyrene phase while the rubber portion is soluble in the rubber solution.

The "prepolymer" is then transferred to a further reactor where polymerisation is completed in aqueous suspension using conventional catalysts, additives and techniques.

This process suffers from the disadvantages that considerable difficulty is experienced in controlling the temperature during prepolymerisation, that prepolymerisation is time consuming and that the formation of excess graft copolymer, which is difficult to avoid, decreases the particle size of the rubber, thus impairing the properties of the final product.

According to the present invention there is provided a process for the production of a toughened polyvinyl aromatic composition which process comprises dissolving a preformed polyvinyl aromatic compound and rubber in a monomeric vinyl aromatic compound, suspending the resulting solution in water, subjecting the resulting suspension to polymerising conditions whereby the monomeric vinyl aromatic compound is polymerised and recovering toughened polyvinyl aromatic compound.

Suitably 5 to 30, preferably 10 to 20, parts polyvinyl aromatic compound and suitably 0.5 to 20, preferably 2 to 9, parts rubber are used per 100 parts monomeric vinyl aromatic compound initially employed.

The polyvinyl aromatic hydrocarbon and the rubber may both be dissolved in the same monomeric vinyl aromatic compound but it is better if each is separately dissolved in a different batch of monomer and the resulting solutions are subsequently blended.

In this case, preferably the blend is thoroughly homogenised by stirring at elevated temperature, suitably in the range 20 to 120° C., before suspension is effected.

Suitable vinyl aromatic compounds include styrene, ortho- and para - monochlorostyrenes, di - chlorostyrenes and vinyl toluene.

Suitable rubbers include polybutadienes, styrene/butadiene random copolymers, styrene/butadiene block copolymers and ethylene/propylene rubbers.

When the blend is suspended in water, suitably 50 to 300 parts, preferably 80 to 120 parts, water are employed per 100 parts blend.

Suitable initiators include benzoyl peroxide, di-cumyl peroxide, tertiary butyl perbenzoate, lauryl peroxide, di-tertiary butyl peroxide and 2-azo-bis-isobutyro-nitrile.

Suitable suspension stabilisers include polyvinyl alcohol, styrene/maleic anhydride copolymers and hydroxyethyl cellulose.

Suitable wetting agents include anionic surface active agents such as sodium caproate and sodium oleate, organic sulphates and sulphonates such as long chain alkyl sulphates and sulphonates, alkyl aromatic sulphonates, aryl alkyl polyether sulphonates, sodium salts of alkyl phosphates and the reaction product of tertiary butyl hydroperoxide and sodium formaldehyde sulphoxylate.

Other conventional ingredients of suspension polymerisation recipes, for example, white mineral oil and stearic acid, may also be added.

Reaction conditions, e.g., ratios and concentrations of ingredients, and temperatures and times of polymerisation are conventional.

It will thus be seen that a process according to the present invention does not suffer from the disadvantages of the prior art process previously discussed.

The invention is illustrated by the following example.

EXAMPLE

A solution of 4 parts rubber (Plioflex 5001 polybutadiene, Plioflex is a registered trademark) in 35 parts styrene was added to a solution of 18 parts polystyrene (BP Plastics KLP grade) in 47 parts styrene, and the mixture stirred at 350 r.p.m. for 2 hours in a 5 gallon reactor at 99° C. Dicumyl peroxide (0.05 part) and butyl stearate (2.5 parts) were then added and the mixture was suspended in 100 parts distilled water containing 0.1 part polyvinyl alcohol, 0.5 part NaCl, 0.01 part t-butyl hydroperoxide and 0.005 part sodium formaldehyde sulphoxylate. The suspension was heated at 130° C. for 8 hours and 140° C. for 4 hours.

All parts are parts by weight.

The product had the following properties:

Softening point (BS 2782/102C)—87° C.
MFI (ASTM D1238/G)—5.4
Tensile strength (BS 2782/301J)—3,570 p.s.i.
Elongation (BS 2782/301J)—25%
Impact strength (BS 2782/306A(C))—1.0 ft. lb./in. notch.

What we claim is:

1. In a process for the production of a toughened polyvinyl aromatic composition which comprises the steps of dissolving a preformed polyvinyl aromatic compound, and rubber selected from polybutadiene, styrene/butadiene random copolymer, styrene/butadiene block copolymer or ethylene/propylene rubber in a monomeric vinyl aromatic compound selected from styrene, ortho- or para-mono-chlorostyrene, dichlorostyrene or vinyl toluene, suspending the resulting solution in water, polymerising in the presence of a free radical catalyst and recovering toughened polyvinyl aromatic compound, the improvement which comprises polymerising said monomeric vinyl compound subsequent to said suspension step.

2. A process according to claim 1 where between 5 and 30 parts polyvinyl aromatic compound are used per 100 parts monomeric vinyl aromatic compound.

3. A process according to claim 2 where 10 to 20 parts polyvinyl aromatic compound are used per 100 parts monomeric vinyl aromatic compound.

4. A process according to claim 1 where 0.5 to 20 parts rubber are used per 100 parts monomeric vinyl aromatic compound.

5. A process according to claim 4 where 2 to 9 parts of rubber are used per 100 parts monomeric vinyl aromatic compound.

6. A process according to claim 1 where the polyvinyl aromatic compound and the rubber are dissolved in separate batches of monomer and the resulting solutions subsequently blended.

7. A process according to claim 6 where the blend is stirred at a temperature in the range 20 to 120° C. before suspension.

8. A process according to claim 6 where the blend is suspended in 50 to 300 parts water per 100 parts blend.

9. A process according to claim 8 where the blend is suspended in 80 to 120 parts water per 100 parts blend.

10. A process according to claim 1 using benzoyl peroxide, dicumyl peroxide, tertiary butyl perbenzoate, lauryl peroxide, di-tertiary butyl peroxide or 2-azo-bis-isobutyro nitrile as initiator.

11. A process according to claim 1 when the suspension is stabilized by polyvinyl alcohol, styrene/maleic anhydride copolymers or hydroxy ethyl cellulose.

12. A process according to claim 1 where a wetting agent selected from sodium caproate, sodium oleate or the reaction product of tertiary butyl hydroperoxide and sodium formaldehyde sulphoxylate is used.

13. A process according to claim 1 where white mineral oil or stearic acid is added.

References Cited
UNITED STATES PATENTS

| | | | |
|---|---|---|---|
| 3,004,938 | 10/1961 | Chambers et al. | 260—17 |
| 3,278,642 | 10/1966 | Lee | 260—880 |
| 3,379,667 | 4/1968 | Pampus et al. | 260—29.7 |

WILLIAM H. SHORT, Primary Examiner

L. M. PHYNES, Assistant Examiner

U.S. Cl. X.R.

260—876, 880